United States Patent [19]
Auspurg et al.

[11] 3,869,603
[45] Mar. 4, 1975

[54] STORAGE UNIT TEST CONTROL DEVICE

[75] Inventors: Heinz Auspurg, Gauting; Josef Huber, Munchen; Jürgen Rabold, Munchen; Günther Wöhlert, Munchen, all of Germany

[73] Assignee: Siemens Aktiengesellschaft, Berlin and Munich, Germany

[22] Filed: July 23, 1973

[21] Appl. No.: 381,613

[30] Foreign Application Priority Data

Aug. 28, 1972 Germany ........................... 2242279

[52] U.S. Cl. .................... 235/153 AM, 340/174 ED
[51] Int. Cl. ............................................ G11c 29/00
[58] Field of Search 235/153 AC, 153 AM, 153 AK; 340/174 ED, 174 TC, 172.5; 179/172.5 R

[56] References Cited

UNITED STATES PATENTS 3,579,199 5/1971 Anderson et al. ........... 235/153 AM

*Primary Examiner*—Eugene G. Botz
*Assistant Examiner*—R. Stephen Dildine, Jr.

[57] ABSTRACT

A device is disclosed for detecting faults in a storage unit of a program controlled data switching system comprising processing units and the storage unit, the device comprises a storage test control connected over a communication input/output channel to the storage unit for transferring test information and control data thereto; a supplementary information channel connecting said processing unit to said test control for transferring said test information and said control data thereto, and a control panel having a manual input section for input of said control data and said test information. A two-position switch on this panel has the first position providing for the automatic input from the processing units, and a second position providing for manual input thereof over the supplementary information channel.

The test control includes register means for storing the manual information applied in successive cycles to subunits of the unit under test, and a comparator for comparing the nominal values read into a subunit with the data read out therefrom, and means for generating an error signal in the event of a mismatch. Means is also provided for adjusting the invention input to allow for the different trading of read wires through the cores of the storage unit.

14 Claims, 3 Drawing Figures

STORAGE UNIT TEST CONTROL DEVICE

FIELD OF THE INVENTION

The invention relates to a circuit arrangement for detecting faults in the storage unit of a program-controlled data switching system comprising a plurality of processing units and a storage unit.

BACKGROUND OF THE INVENTION

In a processing system, preferably a program-controlled data switching system comprising a plurality of processing units and a common storage unit, the storage unit, as compared to the processing units, is equipped with a multiplicity of electronic components, so that more than other components the storage unit is extremely susceptible to malfunctioning. To counteract this susceptibility to trouble, the storage unit is first provided in duplicate. If a storage unit fails completely or in part, the processing system can sustain normal operations with the second storage unit, which remains intact. To do this, only a loss of redundancy must temporarily be put up with. However, if a fault occurs, the source of the malfunction must be located forthwith, so that the defective storage can be repaired without delay.

To test a storage unit, a commonly known technique is to perform a test writing and test reading, the storage unit being connected to a special testing device in the course of conducting such tests. A resulting disadvantage is that this testing deivce checks the storage unit as a separate unit only, and no regard is paid to its interaction with the overall processing system. A further inconvenience is that the storage unit to be tested must be disconnected from the remainder of the system and subsequently connected to the testing device.

SUMMARY OF THE INVENTION

It is an object of the invention to provide a storage testing device which is permanently incorporated into the processing system and which at any time, particularly after the occurrence of a fault, can be triggered into operation with minimum impairment to the working order of the storage unit.

In accordance with the invention, the foregoing and other objects are achieved by the provision of a storage test control unit connected with the storage unit for the input and output of test information over an information input and output channel. The storage test control unit can also be connected to the processing units over a supplementary information channel for programmed input of test information and test data; a control panel is also provided for manual input of control data, a switch being provided in the control panel by means of which the programmed or manual input of the control data is alternately enabled and disabled.

In a particularly advantageous embodiment of the invention, a test register block is provided in the storage test control unit for receiving test data and test information. To do this, the test register block is connected at its input end with the processing units and with the control panel over the control data input channels, and at the output end with the information input channel and with a first theoretical value register, a second theoretical value register being connected after the first. The information output channel of the storage unit is connected with a word output register, which in turn is connected through an information comparator to the second theoretical value register. A test control unit is provided, which is connected with the test register block, the control panel and an interrupt status register over control lines and is responsive to the information comparator to provide control signals thereto.

In a further development of the invention, in a processing system wherein the storage unit comprises a plurality of storage subunits, a storage input/output control unit is provided to which are connected over standard interface devices on the one side the storage subunits and on the other side, the processing units; the storage test control unit, according to a further development of the invention, is connected over by-pass circuits to all of these standard interfaces of the storage input/output control unit which are assigned to the storage submits to select one submit for testing.

BRIEF DESCRIPTION OF THE DRAWING

The principles of the invention will be more readily understood by reference to the description of a preferred embodiment given hereinbelow in conjunction with the drawing, wherein.

DESCRIPTION OF A PREFERRED EMBODIMENT

Figure 1:
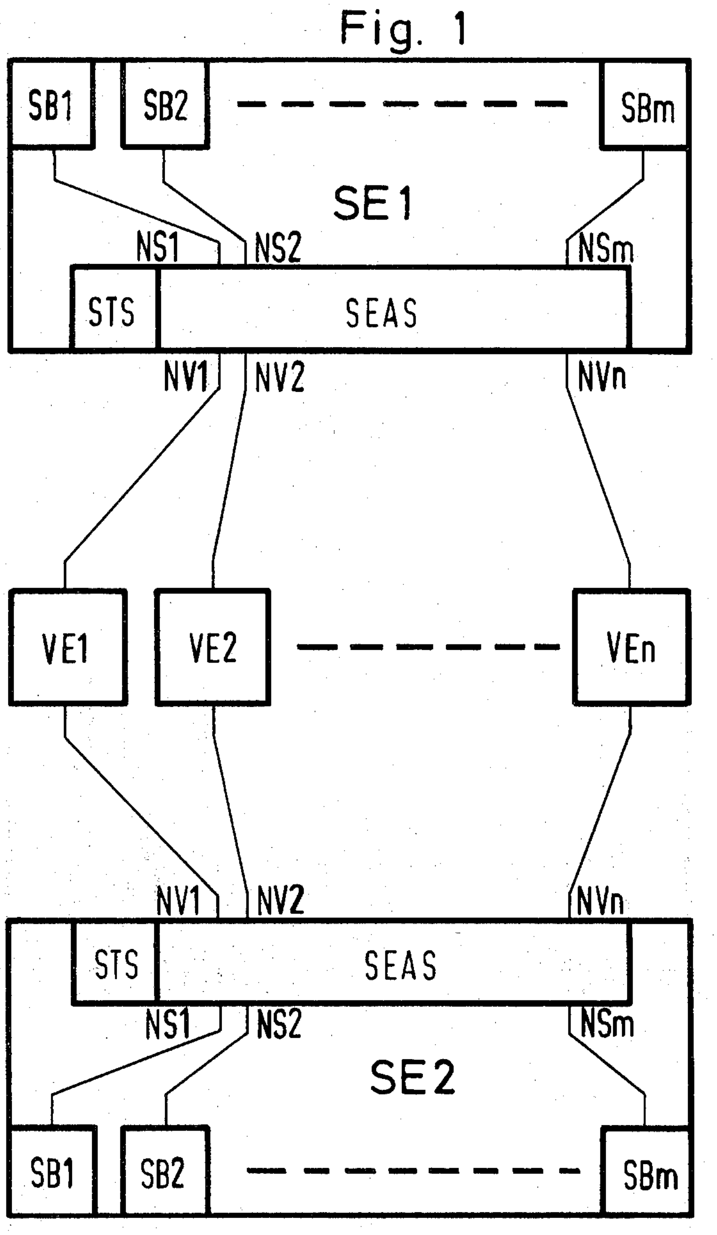
FIG. 1 is a block schematic diagram of a general processing system, into which a storage test control unit is incorporated.

FIG. 1 shows a general processing system having the processing units VE1 to VE2 and the two storage units SE1 and SE2. For reasons of redundancy the storage unit is provided in duplicate. To achieve this purpose, the two units are identical and operate synchronously. This duplication of system units may also be applied to the processing units. Thus, it is possible that, by way of example, the processing units VE1 and VE2 are identical and operate synchronously.

Each storage unit comprises a plurality of storage subunits SB1 to SBm. In each storage unit there is provided a storage input/output control unit SEAS, to which the storage subunits are connected over the standard interfaces NS1 to NSm and the processing units over the standard interfaces NV1 to NVn. Over the storage input/output control SEAS the processing units VE, nested in time, are each provided with a transmission path to the storage subunits SB.

A detailed description of the storage input/output control and of the through-connection of a signal and information path between the processing units and the storage units is found in commonly assigned U.S. patent application Ser. No. 61,692 filed Aug. 6, 1970 now U.S. Pat. No. 3,792,439.

Since one must expect the storage unit to show increased susceptibility to trouble due to the large number of components, according to the invention, the storage unit is provided with a storage test control STS cooperating with the storage input/output control SEAS.

Figure 2:
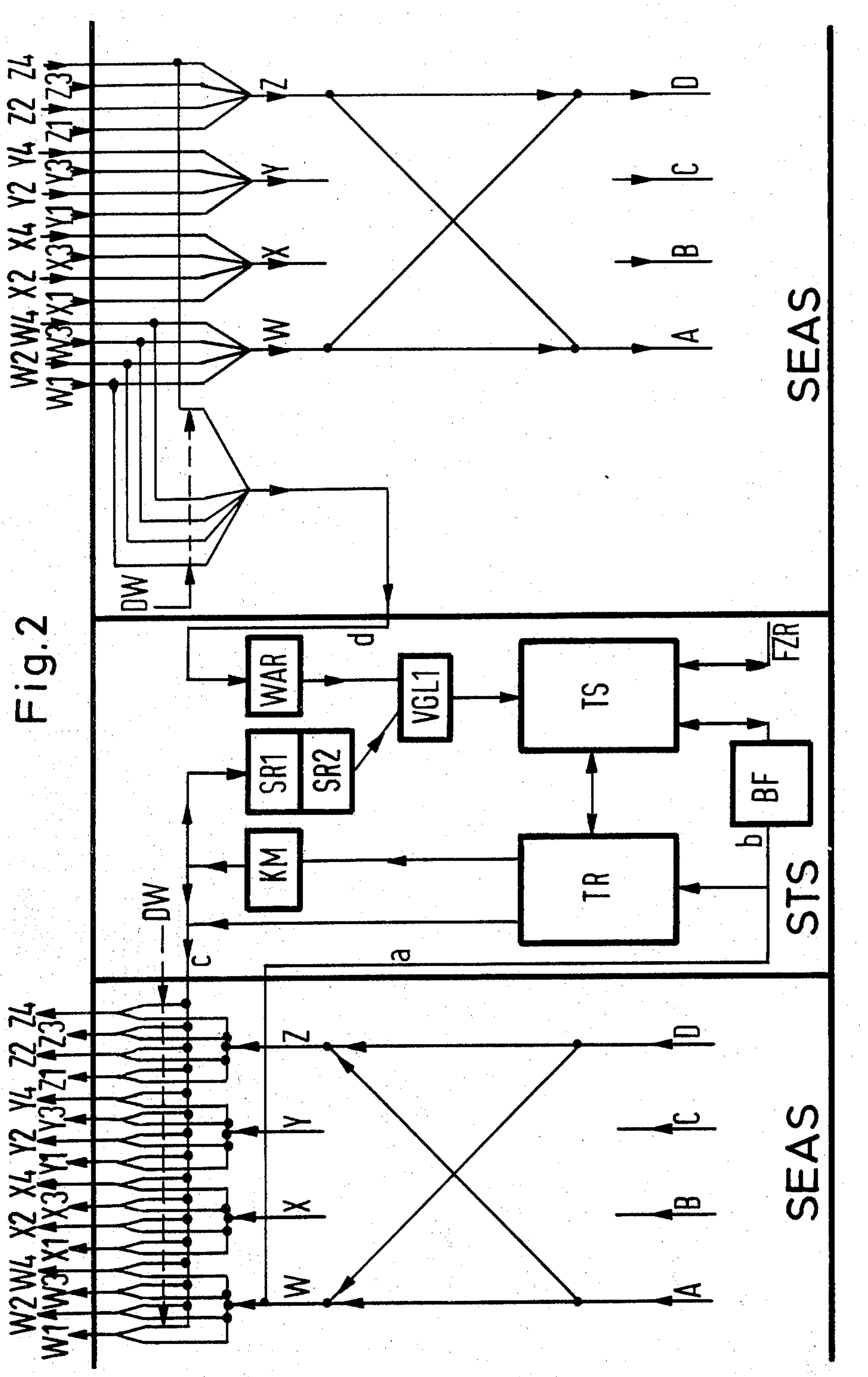
FIG. 2 is a schematic diagram of the storage test control unit and its incorporation into the overall processing system.

FIG. 2 shows in greater detail the storage test control STS itself and the integration of the storage test control into the overall processing system.

FIG. 2 shows the storage test control STS and to the right and left thereof the storage input/output control SEAS. Actually, the storage input/output control is not divided into two halves. This illustration is merely chosen for clearer identification. To the left of the storage test control STS is shown the portion of the storage input/output control SEAS over which is caused an information and signal transmission from the processing units VE to the storage units SB, and to the right of the storage test control is shown the portion of the storage input/output control SEAS over which the information and signals are transmitted from the storage subunits SB to the processing units VE. The embodiment shown in FIG. 2 strictly refers to a storage unit as described in U.S. patent application, Ser. No. 61,692. A total of 16 storage subunits SB are found in this storage unit. In order to be able to connect these storage subunits to the storage input/output control SEAS, 16 standard interfaces *w*1 to *z*4 are provided in the storage input/output control SEAS, namely, both for the information signal input/output and for the control signal input/output to or from the storage subunits. In the storage input-/output control, four nodes W,X,Y and Z at a time are assigned to the storage units, and nodes A,B,C and D to the processing units, the nodes W,X,Y and Z being fully intermeshed with the nodes A,B,C and D. Thus, it is possible to connect, in parallel, from the nodes A,B,C and D to the nodes W,X,Y and Z and vice versa four information and signal paths at a time between the processing units and the storage subunits.

The storage test control STS is connected directly, for example, with the crosspoint W, over an information channel a, for the programmed input of control data and test information. For the input/output of the test information to or from the storage subunits, the storage test control is directly connected to the standard interfaces *w*1 to *z*4 over by-pass circuit DW and the information input/output channels c and d. Furthermore, the storage test control is coupled to an interrput status register FZR in a program request control (not shown, whose mode of operation is not essential for understanding the invention). The significance and the mode of operation of the interrupt status register FZR are described in commonly assigned U.S. patent application, S.N. 293,498 filed Sept. 29, 1972.

The storage test control STS itself has a control panel BF for the manual input of test information and test data and for evaluating the reactions of the storage test control.

Figure 3:
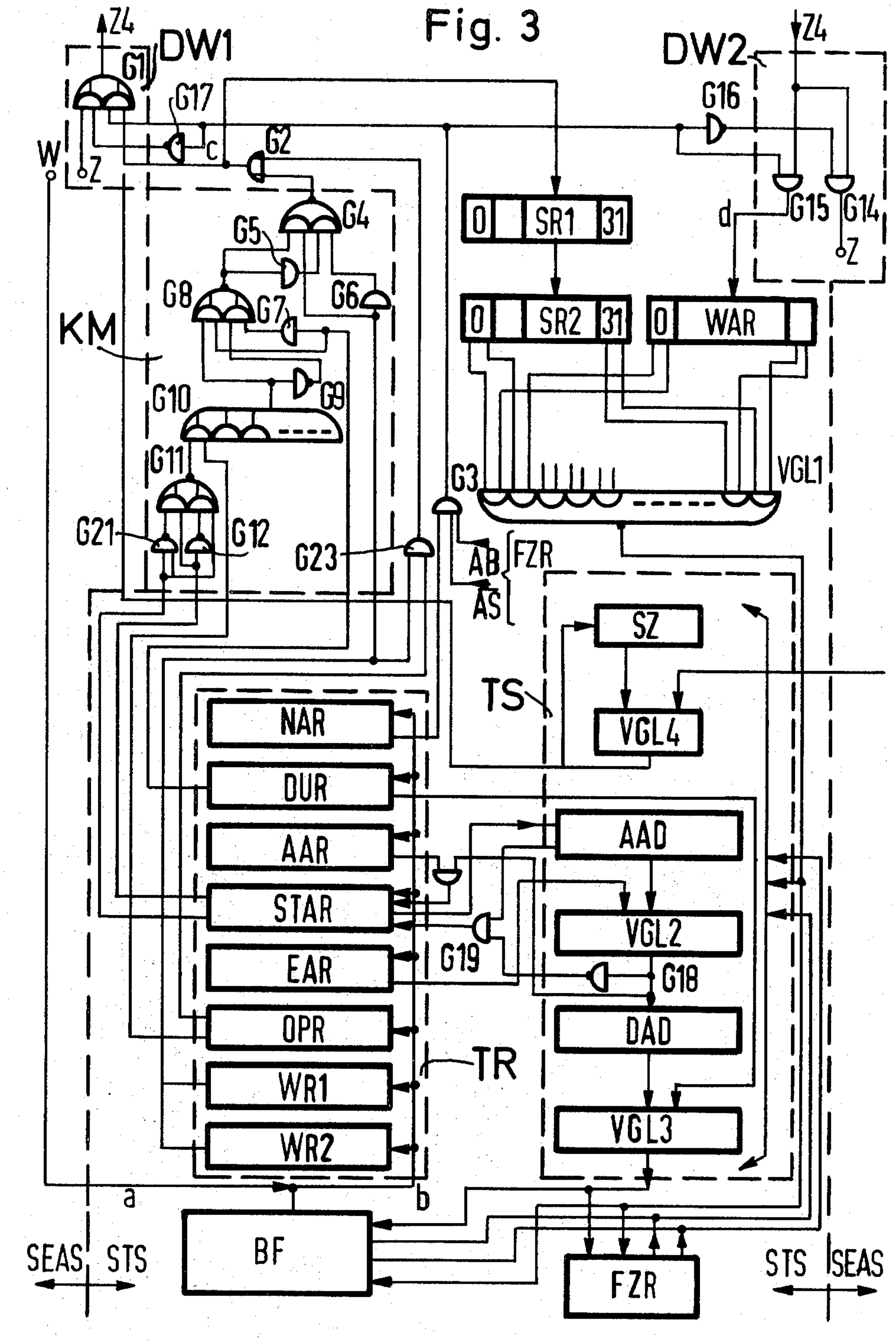
FIG. 3 is a detailed schematic diagram of the storage test control unit according to the invention.

The essential elements of the storage test control are a test register block TR and a test control TS. Furthermore, there are provided in the storage test control STS a critical sample circuit KM, as well as two series-connected nominal value registers SR1 and SR2, a work output register WAR and an information comparator VGL1. The test register block TR is directly connected with the informataion channels, *a*, *c* and with the test control TS as well as over the critical sample circuit KM to the information channel c and the first nominal value register SR1. The information channel *d* leads directly to the word output register WAR, through which it is connected to the information comparator VGL1 in conjunction with the second nominal value register SR2. The output results of the information comparator VGL2 are reported immediately to the test control TS and therethrough to the control panel BF and the function status register FZR (FIG. 3). In addition, further signals can be sent from the test control TS to the control panel BF and to the interrupt status register FZR and vice versa. Start and stop signals by which the test control is activated or stopped are transferrable from the control panel to the test control; the control panel or the interrupt status register, upon completion of the test, receive an acknowledgement signal over these connections. The control panel BF is further connected with the test register block TR over a communication channel *b*. The test register block TR can be manually fed with test information and test data from the control panel BF over the communication channel *b*. The storage test control is unambiguously set for automatic or manual control by a two position switch in the control panel.

If upon the occurrence of a fault in a storage subunit SB during the run of a diagnostic program in a processing unit VE the use of the storage test control STS is desired, assuming that the switch in control panel BF is set for automatic operation, the test register block TR is loaded with the test information and test data for each program over the communication *a*. Then, in the interrupt status register FZR a start bit is also set for each diagnostic program, thereby activating the test control TS. Thereupon, the test information is transferred in response to an address received in a known manner from the test register block TR over the critical sample circuit KM to the storage area being tested and written in the storage subunit SB being tested over the communication channel *c*. The opening of the switching circuit DW, which is connected in series with the standard interface to which the storage subunit being tested is connected, is caused by a special identification of this switching circuit DW in the test register block TR. When the storage subunit or the storage block SB being tested is filed with test information, the test information is subsequently read and written in word-organized form as a set of instantaneous values into the word output register WAR over the communication chanel d. The reading of the instantaneous values and, thus, the writing into the word output register WAR, always take place at the end of a storage cycle, at the start of which the associated nominal value information is produced from the test register block TR over the critical sample circuit KM. Since the storage cycles of the storage test control run sequentially, that is to say, without interruption, immediately after reading of the instantaneous value information and the writing thereof into the word output register WAR, the nominal value information of the next storage word is written into the nominal value register SR1. In order to prevent the destruction of the nominal value information associated with the instantaneous value information stored at a particular instant in the word output register WAR, rendering it unavailable for a subsequent comparison, a second nominal value register SR2 is arranged following the first nominal value register SR1. The latter register SR2 receives with the subsequent system clock pulse the nominal values from the first nominal value register SR1. After the transfer of the word output information to the register WAR, the nominal values stored in the register SR2 are compared by the comparator VGL1 with the instantaneous values in the word output register WAR. The result of the comparison is routed to the test control TS and, when the circumstances require, an error signal is derived, which is sent to all relevant places, for example, to the interrupt status register FZR (FIG. 3) to the control panel BF, and to the storage subunit SB being tested.

The construction of the storage test control STS and of the selection circuit DW will be discussed in detail with reference to FIG. 3.

To show their correspondence to FIG. 2, the test register block TR, the test control TS, and the critical sampling circuit KM are framed in broken-lines in FIG. 3.

The test register block TR contains eight registers, including a standard interface connecting register NAR, in which there is a bit location for each standard interface *w*1 to *z*4; and, a buffer register DUR, in which the number of desired test runs is stored. An initial address register AAR, a start register STAR and an end-address register EAR are also provided. In these registers, the initial address and the end address as well as the instantaneous start address of the storage block in a storage subunit being tested are held. In an operation register OPR, the bit locations are assigned to specified operations with respect to the test information to be written in the storage subunit to be tested and with respect to sepcified operations in the tested storage subunit. The test information in this embodiment, a half-word, is stored in the word register WR1 and WR2.

If the use of the storage test control STS is desired for each program and the switch (not shown) in the control panel BF is set at automatic, the test information and the test data are written into the registers of the block TR over the communication channel a. Then, the bit location is set in the standard interface connection register NAR identifying the standard interface to which the storage subunit to be tested is connected. Each bit location of the standard interface register NAR is followed by a gate G3, of which only one is shown. To this gate G3 are routed the signals AB and $\overline{AS}$ from the interrupt status register FZR over two supplementary inputs, the signal AB signifying that the storage subunit to be tested is in the failure condition, whereas the signal $\overline{AS}$ means that the whole storage unit in which the test is being performed is not in the failure condition. The inverted output signal of the gate G3 is sent directly over gates G17 and G16 to the by-pass circuit DW and transmitted therein to gates G1, G15 and G14. Only the by-pass circuit DW associated with the standard interface z4 is shown by way of example, but all by-pass circuits of the standard interfaces are constructed alike. Moreover, it is to be noted that the transfer of the information, the address, the storage operation code and the other operational signals occur in parallel over the standard interfaces. Therefore, for each bit transferred over a standard interface, a gate G1 or the gates G15, G14 are provided in the switching selection circuit DW. To understand the invention, it suffices to discuss how a bit location is switched with respect to the selection circuit DW. The left switching selection circuit DW1 for the input of information into the storage subunit is, for example, connected with the crosspoint Z and with the communication input channel of the storage test control c. Depending on the output signal of the gate G3, a communication path is established to the output of gate G1 and, thus, to the output of the switching circuit DW1 either for the communication channel *c* or for the communication channel leading to the crosspoint Z. Likewise, in the case of switching circuit DW2 for the output of information from the storage subunit, a connection is established by the output signal of gate G3 from the standard interface, for example, *z*4. Hence if, by way of example, the storage subunit SB connected to the standard interface *z*4 is to be checked by the storage test control STS, the bit location associated with the standard interface *z*4 is set in the standard interface register NAR. Thus, a logic 1 is produced in conjunction with the signals Ab and $\overline{AS}$ at the output of gate G3. As a result, one transmission at a time is switched through to the standard interface *z*4 for the communication channels *c* and *d*.

Thereafter, the test control TS is started by a start bit in the interrupt status register FZR. That is the initial address from the initial address register AAR is accepted by the start address register STAR; subsequently the test information from the word registers WR1 and WR2 is introduced into the storage location designated by the start address. The start address is then accepted by the address adder AAD of the test control TS, increased by 1, and subsequently written back into the start address register STAR, so that in the second storage cycle the test information is written into the storage location following thereafter.

The writing of the test information may, depending on specified bit locations in the operation register OPR take place directly over gates G13 and G2 or over the critical-sample circuit KM. When the critical-sample bit location is set in the operation register OPR, the gate G13 is inhibited, so that the test information is introduced into the storage subunit SB to be tested over the critical-sample circuit KM and the Gate G2. The critical-sample circuit KM is, for example, connected with two sepcified bit locations of the starting address register STAR. Depending on these specified bit locations of the starting address register, the test information to be written is inverted by the critical-sample logic circuit shown (KM) or is routed unchanged to the communication channel *c*. By feeding the test information over the critical-sample circuit KM, the fault compensation caused by the different positive or negative threading of the read wire onto the storage cores is cancelled out. It is possible, particularly in the case of storage subunits SB of a different construction, to provide a plurality of critical-sample circuits KM which are controlled over the gate G10 from various bit locations of the starting address register STAR. In this case, a bit location in the operation register OPR would be assigned to each critical-sample circuit.

When the test information is written in the last location of the storage block to be tesed, the end address is stored in the end address register EAR. A signal is generated over a comparator VLG2, which compares the starting address held in the address adder AAD with the end address, so that further transfer of the starting address to and from the address adder over the gates G18 and G19 is prevented and the starting address is reintroduced from the initial address register AAR to the starting address register STAR over the gate G20.

In addition, the output signal of the comparator VGL2 is sent to a buffer adder DAD. This buffer adder DAD counts, commencing with the start of the storage test control, the storage cycle runs during the test of the entire storage block. The desired number of storage cycle runs to be performed by the storage test control STS is stored in the buffer register DUR of test register TR. The content of the register DUR is always compared with the instantaneous position of the buffer adder DAD by means of the comparator VGL3. When the desired number of storage cycle runs has been attained, the storage test control STS is stopped by an output signal from the comparator VLG3 and an acknowledgement signal is sent to the interrupt status register FZR.

Subsequently, when the first storage cycle run is completed and the test information is written into the storage block to be tested, the second storage cycle run is introduced and the test information is read out as actual information from the storage block to be tested, starting with the starting address and written word by word over the communication channel *d* into the word output register WAR. During he readout of the actual information, the corresponding test information introduced previously into the storage subunit is written as nominal value information into the first nominal value information register SR1. In so doing, attention must be paid to the fact that each time at the beginning of a storage cycle, a word of the minimal value information is written into the register SR1 and that each time at the end of the same storage cycle, the actual information is read and written into the word output register WAR. Since the storage cycles are run sequentially, i.e., without interruption, overwriting of the theoretic nominal value information stored at that particular instant in the register SR1, rendering it unavailable for subsequent comparison with the actual information, must be carefully avoided. Therefor, according to the invention, the nominal value information is written from the register SR1 into the second nominal value register SR2, each time displaced by one clock pulse. Thus, it is ensured that the nominal value information can be compared with the associated actual information in the word output register WAR by means of the comparator VLG1. The registers SR1, SR2 and WAR have, e.g., 32 bit locations, depending on the storage word length. The comparator VLG1 has two AND gates with two inputs each for each bit location of the registers SR2 and WAR. In each case, in this example, one input of an AND gate is connected with the inverted output, of the bit location 0 of the register SR2 and the second input of the AND gate is connected with the non-inverted output of the bit location 0 of the register WAR. Similarly, the second AND gate in the comparator VLG1 has an input connected with the non-inverted output of the bit location 0 of the register SR2 and, the other input with the inverted output of the bit location 0 of the register WAR. All the outputs of the AND gaets of the comparator VGL1 are led to a common NOR output. Accordingly, if the contents of a bit location in the registers SR2 and WAR are different, then the comparator VGL1 supplies a logic 0-signal. This signal is evaluated as an error signal and is sent to the interrupt status register FZR and to supervisory circuits in the storage subunit over a signal path (not shown). In addition, the error signal causes the storage test control to stop. However, if no error is found, the storage cycle is run, and readout of the actual information and comparison with the nominal value information is performed until the end of the storage block to be tested is reached. Subsequently, utilizing a simple logic configuration not shown here, the nominal value information is inverted and again introduced into the storage block to be tested. Subsequently, there again follows a storage cycle run comprising readout of the actual information and comparison with the present nominal value information. These storage cycle runs are repeated until the number indicated in the buffer register DUR is reached, in which case the comparator VGL3 sends an acknowledgement signal to the interrupt status register FZR.

It is to be noted that the comparators VGL1, VGL2 and VGL3 are constructed alike, and of a standard logic design.

Should the storage test control STS not be controlled automatically but by hand, the two position switch (not shown) in the control panel BF is placed in the manual position. Thereafter, data is applied to the test registers TR over an input keyboard in the control panel BF and over the communication channel *b*. To achieve this, the test registers TR are connected separately, bit-by-bit, with the control panel BF. After loading the test registers TR, a start signal is sent to the test control TS from the control panel BF, and the storage test control STS commences operating in the same manner as when started automatically. The storage test control STS reacts by sending the acknowledgement signal and, as generated, the error signal to the control panel BF. These may be displaced thereon for visual evaluation.

Also, provided in the operation register OPR are various bit locations to which are assigned specified operations in the storage subunit SB to be tested or in the storage test control STS itself. By way of example, a specified bit in the operation register OPR signals a restart. In case of a malfunction, and, thus, of a stoppage of the storage test control STS, this causes the cyclic storage readout of actual information and comparison with nominal value information to continue, commencing from the instantaneous starting address. Another bit is assigned to start the test operation parity-routine. This operation causes, in conjunction with the critical-sample circuit the introduction of information susceptible to error into the parity bit locations of the storage subunit under test. In the operation register OPR, there are furthermore provided bits for initiating the operations read, read and comparison, and writing of the test information as well as the AND, OR operations to be conducted between the test information read and the test information to be written. There are further provided bits for the operations read - change, change of the supply voltage, and "dummy" cycle.

Finally, there is provided in the test control TS a step counter SZ and a comparator VGL4. The step counter SZ begins its count at the start of each storage cycle; the counter position is compared with the timing data indicated in the storage input/output control SEAS with respect to a storage cycle in the tested storage subunit. Depending on the result of the comparison in the comparator VGL4, the timing data, cycle time and access time are produced within each storage cycle and transmitted in the form of a storage input signal to the relevant connecting terminal. The comparator VGL4 is constructed according to standard logic principles in the same manner as the comparator VGL1.

The step counter ZS in the storage test control STS is provided although in the storage input/output control SEAS each storage subunit is likewise provided with a step counter ZS, such step counter, however, can not be shared with the storage test control STS, as it simulates for the storage subunit currently being tested an intact storage subunit with respect to the overall processing system and furthermore sustains the synchronous working of the overall system.

We claim:

1. A device for detecting faults in a storage unit of a program controlled data switching system comprising at least a processing unit and said storage unit, said device comprising:

a storage test control, a communication input/output channel connecting said test control and said storage unit for transferring test information and control data between said test control and said storage unit, a supplementary information channel connecting said processing unit to said test control for transferring said test information and said control data to said test control, said storage test control including a control panel having a manual input portion for input of said control data and said test information, said panel and a two-position switch interposed in said supplementary information channel the first position providing for automatic input of said test information and said test data from said processing unit, the second position providing for manual input of said test information and said control data from said manual input portion of said control panel.

2. The device as claimed in claim 1, wherein said storage test control includes a test register means including an input coupled over said supplementary information channel to said processing unit and said control panel for receiving said control data and said test information, and an output connected to said storage unit under test over said communication input channel, a first nominal value register means for storing a first set of nominal values comprising a portion of said test information being transferred from said test register output to said storage unit, a work output register connected over said communication output channel to said storage unit for receiving instantaneous values resulting from said first nominal values stored in said storage unit, a second nominal value register in series with said first register, for substantially concurrently accepting said first nominal values from said first register with receipt by said word output register of said instantaneous values resulting from said first nominal values.

comparator means connected to said second nominal value register and said word output register for comparing the values in said registers, and a test control error indicating means connecting said comparator with said control panel for providing signals indicating the correspondence in said comparator of said first nominal values applied to said storage unit with said instantaneous values received from said storage unit.

3. A device as claimed in claim 2, wherein said test control error indicating means are connected to said test register, and including function status register connected to said test control for halting further processing of said control information and test data.

4. A fault detecting device as claimed in claim 2, including a critical sample circuit connected between said test register and said information input channel, said critical sample circuit including means for adjusting said test information to account for the positive and negative threading of read wires through storage cores of the storage subunit under test in said storage unit.

5. A fault detecting device as claimed in claim 4, wherein said test register includes a start address register having a bit location assigned to a location being filled with said test information in said storage unit, said critical sampling circuit including means responsive to the bit in said bit location to invert or not the test information being applied to said location being filled.

6. The fault testing device of claim 2, wherein said test register includes an initial address register for storing the address of the first location in the storage unit under test to be filled with test information, a starting address register for storing the address of the current location to be filled in the storage unit, and an end address register for storing the address of the last location of the storage unit to be filled with information and tested, said initial address register, start address register and end address register being loaded with information over said supplementary input channel.

7. The fault detecting device as claimed in claim 6, comprising address adder means connected to said start address register for receiving the address of the location being filled with information in said start register, and adding cyclically to said address, and a comparator coupled to said address adder and said end address register for comparing the locations stored therein and for stopping said cyclical adding upon detecting equality therebetween.

8. A fault detecting device as claimed in claim 2, wherein said test register comprises at least one word register for receiving said test information to be applied to each location of said storage unit, a buffer register for storing the number of test runs to be run on said each location of said storage unit under test, and an operating register for designating a specific test operation on said each storage location under test.

9. The fault testing device of claim 8 wherein said test register includes an initial address register for storing the address of the first location in the storage unit under test to be filled with test information, a starting address register for storing the address of the current location to be filled in the storage unit, and an end address register for storing the address of the last location of the storage unit to be filled with information and tested, said initial address register, start address register and end address register being loaded with information over said supplementary input channel.

10. A fault detecting device as claimed in claim 9, wherein said initial address register is connected to said start address register to transfer the address of the initial location to the start address register at the start of each test, and is further connected to said address comparator to reload said initial address at the end of a test to again test the locations defined by said initial and end registers.

11. A fault detecting device as claimed in claim 10, including a count device for counting the number of test runs in a test and a comparator for comparing the number of runs stored in said buffer register with the run count in said counting means, and ending said test after the number of test runs stored in said buffer register.

12. A fault detecting device as claimed in claim 9, wherein said initial address register is connected to said start address register to transfer the address of the initial location to the start address register at the start of each test signal, and is further connected to said address comparator to reload said initial address at the end of a test to again test the locations defined by said initial and end registers.

13. The fault testing circuit as claimed in claim 1, wherein said storage unit comprises a plurality of storage subunits, a storage input/output control including a standard interface for each of said storage subunits linking each of said subunits to said processing unit, and a switching by-pass circuit connecting said storage test control to each of said standard interfaces for selecting a particular subunit for testing by said storage test control by selecting the corresponding interface.

14. The fault testing device as claimed in claim 13, wherein said test control includes a standard connection register for storing the identification number of a subunit under test, said switching circuit being connected to said standard connection register so that only the standard interface designated by the identification number in said register is open for said storage test control to apply test information thereto, said identified interface blocking only said designated storage subunit from said processing unit.

* * * * *